(12) United States Patent
Yokota et al.

(10) Patent No.: US 9,931,624 B2
(45) Date of Patent: Apr. 3, 2018

(54) ANION EXCHANGE RESIN, ELECTROLYTE MEMBRANE FOR FUEL CELL, BINDER FOR FORMING ELECTRODE CATALYST LAYER, BATTERY ELECTRODE CATALYST LAYER AND FUEL CELL

(71) Applicants: TAKAHATA PRECISION JAPAN CO., LTD., Fuefuki-shi, Yamanashi (JP); UNIVERSITY OF YAMANASHI, Kofu-shi, Yamanashi (JP)

(72) Inventors: Naoki Yokota, Fuefuki (JP); Manai Shimada, Fuefuki (JP); Kenji Miyatake, Kofu (JP); Masahiro Watanabe, Kofu (JP); Junpei Miyake, Kofu (JP); Eriko Nishino, Gamo-gun (JP); Koichiro Asazawa, Gamo-gun (JP)

(73) Assignees: TAKAHATA PRECISION JAPAN CO., LTD., Fuefuki-shi (JP); UNIVERSITY OF YAMANASHI, Kofu-shi (JP)

( * ) Notice: Subject to any disclaimer, the term of this patent is extended or adjusted under 35 U.S.C. 154(b) by 0 days.

(21) Appl. No.: 15/126,910

(22) PCT Filed: Feb. 28, 2015

(86) PCT No.: PCT/JP2015/056004
§ 371 (c)(1),
(2) Date: Sep. 16, 2016

(87) PCT Pub. No.: WO2015/141450
PCT Pub. Date: Sep. 24, 2015

(65) Prior Publication Data
US 2017/0087545 A1 Mar. 30, 2017

(30) Foreign Application Priority Data

Mar. 17, 2014 (JP) .................................. 2014-053748

(51) Int. Cl.
| | |
|---|---|
| *B01J 41/13* | (2017.01) |
| *B01J 41/04* | (2017.01) |
| *B01J 47/12* | (2017.01) |
| *C08G 61/12* | (2006.01) |
| *H01B 1/12* | (2006.01) |
| *H01M 8/1067* | (2016.01) |
| *H01M 4/86* | (2006.01) |
| *H01M 8/1018* | (2016.01) |

(52) U.S. Cl.
CPC .............. *B01J 41/13* (2017.01); *B01J 41/04* (2013.01); *B01J 47/12* (2013.01); *C08G 61/12* (2013.01); *H01B 1/122* (2013.01); *H01M 4/8668* (2013.01); *H01M 8/1067* (2013.01); *C08G 2261/146* (2013.01); *C08G 2261/312* (2013.01); *C08G 2261/516* (2013.01); *H01M 2008/1095* (2013.01)

(58) Field of Classification Search
CPC .............. C08G 61/12; C08G 2261/145; C08G 2261/312; C08G 2261/516; H01M 8/1067; H01M 4/8668; H01M 2008/1095; B01J 41/13; B01J 41/04; B01J 47/12; H01B 1/122
USPC .......................................................... 521/27
See application file for complete search history.

(56) References Cited

U.S. PATENT DOCUMENTS

| | | | |
|---|---|---|---|
| 2008/0053820 A1* | 3/2008 | Ikeuchi ................. | C08J 5/2256 204/192.33 |
| 2011/0215240 A1* | 9/2011 | Ikeuchi ................. | C08J 5/2256 250/305 |
| 2012/0016043 A1 | 1/2012 | Hwang et al. | |
| 2013/0086785 A1* | 4/2013 | Cui ........................ | B32B 15/01 29/402.18 |

FOREIGN PATENT DOCUMENTS

| | | |
|---|---|---|
| CN | 102702507 A | 10/2012 |
| JP | 2008-78130 A | 4/2008 |
| JP | 2008078130 A * | 4/2008 |
| JP | 2011-127109 A | 6/2011 |
| JP | 2012-104494 A | 5/2012 |

(Continued)

OTHER PUBLICATIONS

ISA/JP, International Search Report dated Apr. 28, 2015 in International Application No. PCT/JP2015/056004, total 4 pages with translation.
Kenji Miyatake et al., "Tuned Polymer Electrolyte Membranes Based on Aromatic Polyethers for Fuel Cell Applications", Journal of American Chemical Society(JACS) Articles, vol. 129, No. 13, 2007, pp. 3879-3887, Published on web Mar. 13, 2007.
Takuya Shimura et al., "Poly(arylene ether) ionomers containing sulfofluorenyl groups: Effect of electron-withdrawing groups on the properties", European Polymer Journal, vol. 44, p. 4054-4062, 2008 (www.elsevie.com/locate/europolj).
Cy Fujimoto et al., "Backbone stability of quaternized polyaromatics for alkaline membrane fuel cells", Journal of Membrane Science, vol. 423-424, pp. 438-449, 2012 (www.elsevier.com/locate/memsci).
"New Polymer Experiment 3, Synthesis Method and Reaction of Polymer (2), Synthesis of Condensation Polymer", Kyoritsu Shuppan Co., Ltd. p. 7-57, p. 399-401, 1996.

(Continued)

*Primary Examiner* — Michael M Bernshteyn
(74) *Attorney, Agent, or Firm* — Masuvalley & Partners

(57) ABSTRACT

An anion exchange resin having a hydrophobic unit with divalent hydrophobic groups bonded to each other via an ether bond, the divalent hydrophobic groups being composed of one aromatic ring, or being composed of a plurality of aromatic rings which are bonded to each other via a divalent hydrocarbon group, carbon-carbon bond or the like; and a hydrophilic unit having divalent hydrophilic groups bonded to each other via carbon-carbon bond, the divalent hydrophilic groups being composed of one aromatic ring, or being composed of a plurality of aromatic rings which are bonded to each other via a divalent hydrocarbon group or carbon-carbon bond, the aromatic ring or at least one of the aromatic rings having an anion exchange group are bonded via carbon-carbon bond.

3 Claims, 2 Drawing Sheets

(56) References Cited

FOREIGN PATENT DOCUMENTS

| | | | |
|---|---|---|---|
| JP | 2013-47309 A | 3/2013 | |
| JP | 2013047309 A * | 3/2013 | ............ B01J 41/13 |
| WO | 2014/050928 A1 | 4/2014 | |

"Diaion Ion Exchange Resin/Synthetic Adsorbent Manual [I] Basic Edition", Mitsubishi Kasei Corporation, Jun. 1, 1992, vol. 5, p. 17-21.

JPO, Notice of Reason of Refusal(Office Action) dated Feb. 9, 2016 in corresponding JP Patent Application No. 2014-053748, total 9 pages including English translation.

JPO, Final Office Action dated May 10, 2016 in corresponding JP Patent Application No. 2014-053748, total 13 pages including English translation.

* cited by examiner

ANION EXCHANGE RESIN, ELECTROLYTE MEMBRANE FOR FUEL CELL, BINDER FOR FORMING ELECTRODE CATALYST LAYER, BATTERY ELECTRODE CATALYST LAYER AND FUEL CELL

RELATED APPLICATIONS

The present invention is the U.S. National Phase of, and claims priority to, International Patent Application No. PCT/JP2015/056004 filed Feb. 28, 2015, which claims priority to Japanese Patent Application No. JP 2014-053748 filed Mar. 17, 2014; all of which are incorporated herein by reference in their entireties.

TECHNICAL FIELD

The present invention relates to an anion exchange resin, an electrolyte membrane for a fuel cell, a binder for forming an electrode catalyst layer, a battery electrode catalyst layer, and a fuel cell.

BACKGROUND ART

It is known that an anion exchange resin comprises: divalent hydrophobic groups being composed of a plurality of aromatic rings which are bonded to each other via a divalent saturated hydrocarbon group; divalent binding groups being composed of one aromatic ring, or being composed of a plurality of aromatic rings which are bonded to each other via carbon-carbon bond; and divalent hydrophilic groups having a plurality of aromatic rings which are bonded to each other via a divalent saturated hydrocarbon group to which an aromatic ring having an anion exchange group is bonded via carbon-carbon bond; wherein the divalent hydrophobic groups and the divalent binding groups are bonded repeatedly via an ether bond to form a hydrophobic unit; wherein the divalent hydrophilic group and the divalent binding group are bonded repeatedly via an ether bond to form a hydrophilic unit; and wherein the hydrophobic unit and the hydrophilic unit are bonded via an ether bond (Patent Document 1).

PATENT DOCUMENT

Patent Document 1: JP 2013-47309 A

SUMMARY OF THE INVENTION

Problem to be Solved by the Invention

However, there is a problem that the anion exchange resin described in Patent Document 1 has insufficient durability, in particular, alkali resistance.

An object of the present invention is to provide an anion exchange resin being capable of producing an electrolyte membrane for a fuel cell, a binder for forming an electrode catalyst layer and a battery electrode catalyst layer, which have an improved durability, an electrolyte membrane for a fuel cell and a binder for forming an electrode catalyst layer are produced from the anion exchange resin, an electrode catalyst layer produced from the binder, and a fuel cell having the electrolyte membrane or the electrode catalyst layer.

Means of Solving the Problem

In order to solve the problem, the anion exchange resin of the present invention comprises:
divalent hydrophobic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; and
divalent hydrophilic groups being composed of one aromatic ring, or being composed of a plurality of aromatic rings which are bonded to each other via a divalent hydrocarbon group or carbon-carbon bond, the aromatic ring or at least one of the aromatic rings having an anion exchange group;
wherein the divalent hydrophobic groups are bonded to each other via an ether bond to form a hydrophobic unit;
wherein the divalent hydrophilic groups are bonded to each other via carbon-carbon bond to form a hydrophilic unit; and
wherein the hydrophobic unit and the hydrophilic unit are bonded via carbon-carbon bond.

In the anion exchange resin of the present invention, each of the hydrophobic groups suitably has a bisphenol residue which may be substituted with a halogen atom or an alkyl group, as shown in the following formula (1):

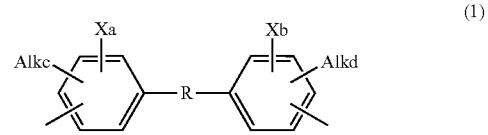

(1)

(In the formula, R represents a hydrocarbon group, a silicon-containing group, a nitrogen-containing group, a phosphorus-containing group, an oxygen-containing group, or a sulfur-containing group, each of which may be substituted with a halogen atom, or direct bond; each Alk is the same or different and represents an alkyl group; each X is the same or different and represents a halogen atom or cyano group; and a, b, c, and d are the same or different and represent an integer of 0 to 4.)

In the anion exchange resin of the present invention, each of the hydrophilic groups is suitably:
a bisphenol fluorene residue substituted with a substituent group having the anion exchange group, as shown in the following formula (3), and/or
an o-, m- or p-phenylene group substituted with a substituent group having the anion exchange group, as shown in the following formula (3'):

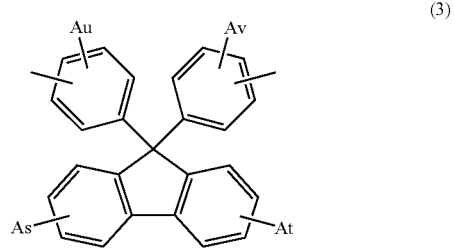

(3)

(In the formula, each A is the same or different and represents a substituent group having an anion exchange group; s, t, u, and v are the same or different and represent an integer of 0 to 4; and at least one of s, t, u, and v represents 1 or more)

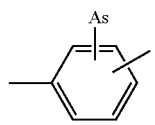

(3')

(In the formula, A represents a substituent group having an anion exchange group; and s represents an integer of 1 to 4.)

In order to solve the problem, the electrolyte membrane for a fuel cell of the present invention comprises the anion exchange resin as described above.

In order to solve the problem, the binder for forming the electrode catalyst layer of the present invention comprises the anion exchange resin as described above.

In order to solve the problem, the battery electrode catalyst layer of the present invention comprises the binder for forming the electrode catalyst layer as described above.

In order to solve the problem, the fuel cell of the present invention comprises:

an electrolyte membrane comprising the anion exchange resin as described above;

an fuel side electrode to which a hydrogen-containing fuel is supplied and an oxygen side electrode to which oxygen and air are supplied, the fuel side electrode and the oxygen side electrode being oppositely disposed by interposing the electrolyte membrane.

In the fuel cell of the present invention, the hydrogen-containing fuel is suitably hydrogen or hydrazine.

In order to solve the problem, the fuel cell of the present invention comprises:

an electrolyte membrane;

an fuel side electrode to which a hydrogen-containing fuel is supplied and an oxygen side electrode to which oxygen and air are supplied, the fuel side electrode and the oxygen side electrode being oppositely disposed by interposing the electrolyte membrane;

wherein the fuel side electrode and/or the oxygen side electrode comprises the battery electrode catalyst layer as described above.

In the fuel cell of the present invention, the hydrogen-containing fuel is suitably hydrogen or hydrazine.

Effect of the Invention

The present invention can provide an anion exchange resin being capable of producing an electrolyte membrane for a fuel cell, a binder for forming an electrode catalyst layer and a battery electrode catalyst layer, which have an improved durability, an electrolyte membrane for a fuel cell and a binder for forming an electrode catalyst layer produced from the anion exchange resin, an electrode catalyst layer produced from the binder, and a fuel cell having the electrolyte membrane or the electrode catalyst layer.

MODE FOR CARRYING OUT THE INVENTION

Figure 1:
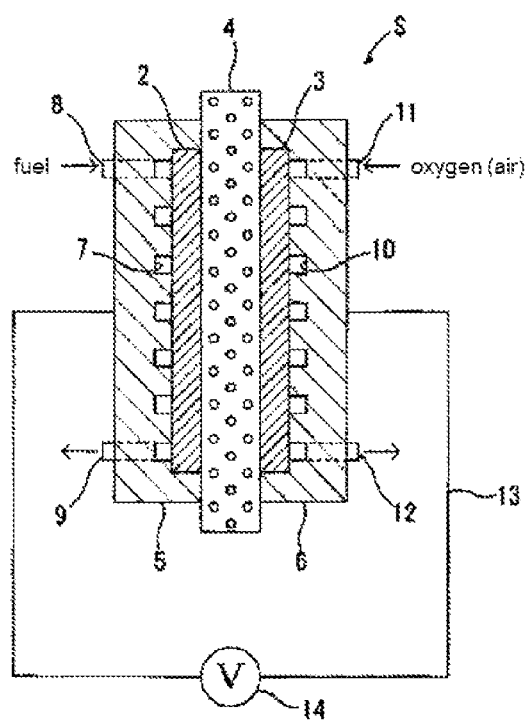
FIG. 1 is a schematic diagram showing an embodiment of the fuel cell of the present invention.

The anion exchange resin of the present invention is composed of divalent hydrophobic groups and divalent hydrophilic groups.

In the anion exchange resin of the present invention, each of the divalent hydrophobic groups is composed of one aromatic ring, or is composed of a plurality of (two or more, and preferably two) aromatic rings which are bonded to each other by a divalent hydrocarbon group, a divalent silicon-containing group, a divalent nitrogen-containing group, a divalent phosphorus-containing group, a divalent oxygen-containing group, a divalent sulfur-containing group, or carbon-carbon bond.

Examples of the aromatic ring include mono- or poly-aromatic hydrocarbons having carbon atoms of 6 to 14 such as, for example, benzene ring, naphthalene ring, indene ring, azulene ring, fluorene ring, anthracene ring, and phenanthrene ring.

Preferred examples of the aromatic ring include mono-aromatic hydrocarbons having carbon atoms of 6 to 14. More preferred examples of the aromatic ring include benzene ring.

The aromatic ring may be substituted with a substituent group such as a halogen atom, an alkyl group, or cyano group, as needed.

When the aromatic ring is substituted with a substituent group such as a halogen atom, an alkyl group, or cyano group, the number and the position of the substituent group such as a halogen atom, an alkyl group, or cyano group is suitably selected depending on the purpose and application.

More specific examples of the aromatic ring substituted with a halogen atom include benzene rings substituted with one to four halogen atoms (for example, benzenes ring substituted with one to four fluorine atoms, benzene rings substituted with one to four chlorine atoms, benzene rings substituted with one to four bromine atoms, and benzene rings substituted with one to four iodine atoms, in which one to four halogen atoms may be all the same or different).

Examples of the divalent hydrophilic group include divalent saturated hydrocarbon groups having carbon atoms of 1 to 20 such as, for example, methylene (—$CH_2$—), ethylene, propylene, isopropylene (—$C(CH_3)_2$—), butylene, isobutylene, sec-butylene, pentylene (pentene), isopentylene, sec-pentylene, hexylene (hexamethylene), 3-methylpentene, heptylene, octylene, 2-ethylhexylene, nonylene, decylene, isodecylene, dodecylene, tetradecylene, hexadecylene, and octadecylene.

Preferred examples of the divalent hydrocarbon group include divalent saturated hydrocarbon groups having carbon atoms of 1 to 3 such as, for example, methylene (—$CH_2$—), ethylene, propylene, isopropylene (—$C(CH_3)_2$—). More preferred examples of the divalent hydrocarbon group include methylene (—$CH_2$—) and isopropylene (—$C(CH_3)_2$—). Particularly preferred examples of the divalent hydrocarbon group include isopropylene (—$C(CH_3)_2$—).

The divalent hydrocarbon group may be substituted with a halogen atom such as, for example, fluorine, chlorine, bromine, or iodine. Preferably, the halogen atom is fluorine.

When the divalent hydrocarbon group is substituted with a halogen atom, the number and the position of the halogen atom is suitably selected depending on the purpose and application.

More specific examples of the divalent hydrocarbon group substituted with a halogen atom include methylenes substituted with a halogen atom (for example, fluoromethylene, difluoromethylene, chloromethylene, dichloromethylene, bromomethylene, dibromomethylene, iodomethylene, and diiodomethylene), and isopropylenes substituted with a halogen atom (for example, fluoroisopropylene, difluoroisopropylene, trifluoroisopropylene, tetrafluoroisopropylene, pentafluoroisopropylene, hexafluoroisopropylene, chloroisopropylene, dichloroisopropylene, trichloroisopropylene, tetrachloroisopropylene, pentachloroisopropylene, hexachloroisopropylene, bromoisopropylene, dibromoisopropylene, tribromoisopropylene, tetrabromoisopropylene, pentabromoisopropylene, hexabromoisopropylene, iodoisopropylene, diiodoisopropylene, triiodoisopropylene, tetraiodoisopropylene, pentaiodoisopropylene, and hexaiodoisopropylene).

Preferred examples of the divalent hydrocarbon group substituted with a halogen atom include isopropylenes substituted with a halogen atom. More preferred examples of the divalent hydrocarbon group substituted with a halogen atom include hexafluoroisopropylene.

Preferably, the hydrophobic group is a bisphenol residue which may be substituted with a halogen atom or an alkyl group (a divalent hydrophobic group being composed of two benzene rings bonded to each other via R), as shown in the following formula (1).

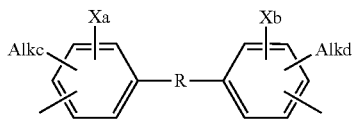

(1)

(In the formula, R represents a hydrocarbon group, a silicon-containing group, a nitrogen-containing group, a phosphorus-containing group, an oxygen-containing group, or a sulfur-containing group, each of which may be substituted with a halogen atom, or direct bond; each Alk is the same or different and represents an alkyl group; each X is the same or different and represents a halogen atom or cyano group; and a, b, c, and d are the same or different and represent an integer of 0 to 4.)

In the above formula (1), R represents a hydrocarbon group, a silicon-containing group, a nitrogen-containing group, a phosphorus-containing group, an oxygen-containing group, or a sulfur-containing group, each of which may be substituted with a halogen atom, or direct bond. Preferably, R represents isopropylene ($—C(CH_3)_2—$) which may be substituted with a halogen atom.

In the above formula (1), each Alk is the same or different and represents an alkyl group. Examples of the alkyl group include alkyl groups having carbon atoms of 1 to 20 such as, for example, methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as, for example, cyclopropyl group, cyclobutyl group, cyclopentyl group, cyclohexyl group, cycloheptyl group, and cyclooctyl group.

In the above formula (1), each X is the same or different and represents the halogen atom or the cyano group as described above.

In the above formula (1), a and b are the same or different and represents an integer of 0 to 4. Preferably, a and b represents an integer of 0 to 2. More preferably, both a and b represents 0.

In the above formula (1), c and d are the same or different and represents an integer of 0 to 4. Preferably, c and d represents an integer of 0 to 2. More preferably, both c and d represents 0.

Particularly preferred examples of the hydrophobic group include a bisphenol residue (bisphenol A residue) as shown in the following formula (4).

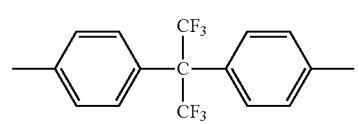

(4)

Preferred examples of the hydrophobic group include biphenylene groups which may be substituted with a halogen atom, as shown in the following formula (2); o-, m- or p-phenylene groups which may be substituted with a halogen atom, as shown in the following formula (2'); o-, m- or p-phenylene groups which may be substituted with cyano group, as shown in the following formula (2"); and o-, m- or p-phenylene groups which may be substituted with an alkyl group, as shown in the following formula (2''').

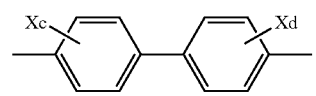

(2)

(In the formula, each X is the same or different and represents a halogen atom; and c and d are the same or different and represents an integer of 0 to 4)

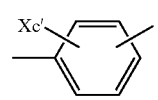

(2')

(In the formula, X represents a halogen atom; and c' represents an integer of 0 to 4)

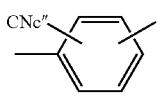

(2")

(In the formula, CN represents cyano group; and c" represents an integer of 0 to 4)

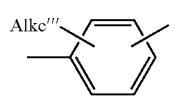

(2''')

(In the formula, Alk represents an alkyl group; and c''' represents an integer of 0 to 4.)

In the above formula (2), each X is the same or different and represents the halogen atom as described above.

In the above formula (2), c and d are the same or different and represents an integer of 0 to 4. From the viewpoint of the radical resistance, at least one of c and d preferably represents an integer of 1 to 4. Particularly preferably, both c and d represent 4.

In the above formula (2'), X represents the halogen atom as described above; c' represents an integer of 0 to 4, and preferably 4.

In the above formula (2''), c'' represents an integer of 0 to 4, and preferably 1.

In the above formula (2'''), Alk represents the alkyl group as described above; c''' represents an integer of 0 to 4, and preferably 1.

Other examples of the hydrophobic group include groups having the following structures.

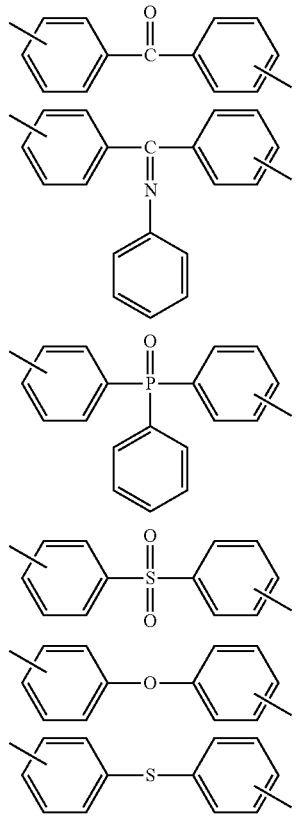

Particularly preferred examples of the hydrophobic group include biphenylene group, biphenylene group as shown in the following formula (5) (biphenylene group in which each of benzene rings is substituted with four fluorine atoms); p-phenylene group, perfluoro p-phenylene group as shown in the following formula (5') (p-phenylene in which benzene ring is substituted with four fluorine atoms); 2-cyano-1,3-phenylene group as shown in the following formula (5'') (m-phenylene group in which benzene ring is substituted with one cyano group).

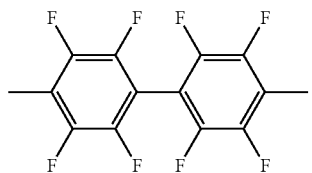

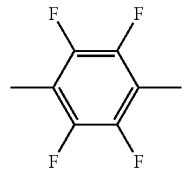

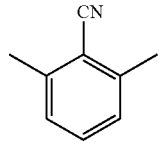

In the anion exchange resin, each of the divalent hydrophilic groups is composed of one aromatic ring, or is composed of a plurality of aromatic rings which are bonded to each other via a divalent hydrocarbon group or carbon-carbon bond, and the aromatic ring or at least one of the aromatic rings has an anion exchange group.

Examples of the aromatic ring include aromatic rings as described above. Preferred examples of the aromatic ring include benzene ring.

Examples of the divalent hydrocarbon group include the divalent hydrocarbon groups which may be substituted with a halogen atom as described above. Preferred examples of the divalent hydrocarbon group include methylene ($-CH_2-$) which is not substituted with a halogen atom.

The number of the aromatic ring bonded to the divalent hydrocarbon group is one or two, and preferably two.

When one aromatic ring is further bonded to the divalent hydrocarbon group, the valence of the hydrocarbon group becomes three. When two aromatic rings are further bonded to the divalent hydrocarbon group, the valence of the hydrocarbon group becomes four (when the number of carbon is 1, the hydrocarbon group is carbon atom).

When two aromatic rings are bonded to the divalent hydrocarbon group, the aromatic rings may be bonded via carbon-carbon bond, for example.

The anion exchange group is introduced in the main chain or the side chain of the hydrophilic group. The anion exchange group is not particularly limited. Specifically, any known anion exchange groups including quaternary ammonium salts, tertiary amine groups, secondary amino groups, primary amino groups, phosphines, phosphazenes, tertiary sulfonium groups, quaternary boronium groups, and quaternary phosphonium groups can be used. From the viewpoint of the anion conductivity, preferred examples of the anion exchange group include quaternary ammonium salts.

Preferred examples of the anion exchange group include $-CH_2N^+(CH_3)_3OH^-$. Other examples of the anion exchange group include groups having the following structures. In the following structural formulae, * represents a moiety bonding to the aromatic ring having a substituent group, the anion ($OH^-$) is omitted.

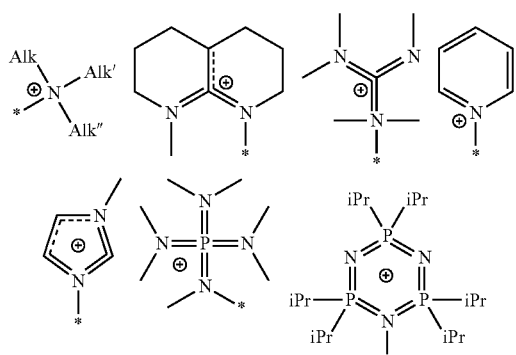

(In the figures, Alk, Alk', and Alk" represent the alkyl group as described above.)

Examples of the aromatic ring having the anion exchange group include the aromatic ring as described above. Preferred example of the aromatic ring having the anion exchange group includes benzene ring.

When the hydrophilic group has a plurality of aromatic rings, at least one of the aromatic rings is substituted with a substituent group having an anion exchange group, or two or more aromatic rings may be substituted with a substituent group having an anion exchange group, or all aromatic rings may be substituted with a substituent group having an anion exchange group. When two aromatic rings are bonded to the divalent hydrocarbon group, at least one of the aromatic rings is substituted with a substituent group having an anion exchange group, for example, one of the aromatic rings in the side chain may be substituted with a substituent group having an anion exchange group, or both of the aromatic rings in the side chain may be substituted with a substituent group having an anion exchange group. One aromatic ring may be substituted with a plurality of substituent groups having an anion exchange group.

Preferred examples of the hydrophilic group include diphenyl fluorene residues substituted with a substituent group having the anion exchange group, as shown in the following formula (3), o-, m- or p-phenylene groups substituted with a substituent group having the anion exchange group, as shown in the following formula (3').

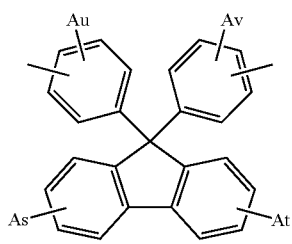

(3)

(In the formula, each A is the same or different and represents a substituent group having an anion exchange group; s, t, u, and v are the same or different and represents an integer of 0 to 4; and at least one of s, t, u, and v represents 1 or more)

(3')

(In the formula, A represents a substituent group having an anion exchange group; and s represents an integer of 1 to 4.)

In the above formula (3), each A is the same or different and represents a substituent group having the anion exchange group as described above. Preferably, each A represents quaternary ammonium groups as described above.

In the above formula (3), s, t, u, and v are the same or different and represents an integer of 0 to 4; and at least one of s, t, u, and v represents 1 or more.

In the above formula (3), when s, t, u, and/or v is a range of 1 to 3, the position of the substituent group having an anion exchange group is suitably selected depending on the purpose and application.

In the above formula (3'), A represents a substituent group having the anion exchange group as described above. Preferably, A represents quaternary ammonium groups as described above.

In the above formula (3'), s represents an integer of 1 to 4. The position of the substituent group having an anion exchange group is suitably selected depending on the purpose and application.

Other examples of the hydrophilic group include groups having the following structures.

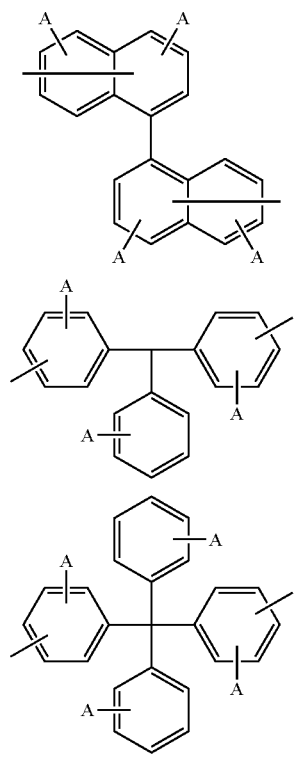

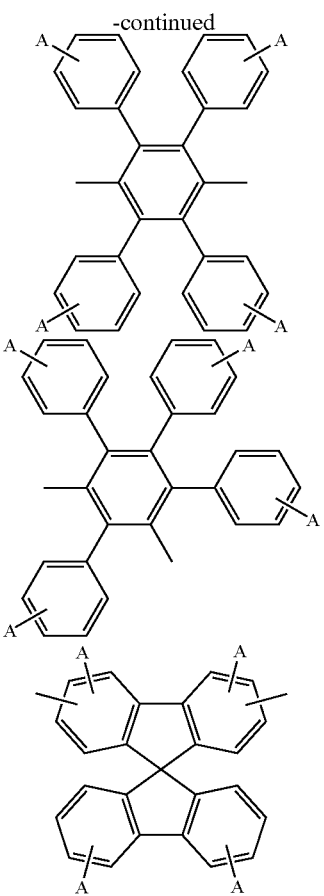

(In the formulae, each A represents a substituent group having an anion exchange group or a hydrogen atom, and at least one of A is a substituent group having an anion exchange group. A plurality of A may be bonded to one benzene ring structure.

Particularly preferred examples of the hydrophilic group include bisphenol fluorene residues as shown in the following formula (6), p-phenylene groups as shown in the following formula (6'), and m-phenylene groups as shown in the following formula (6").

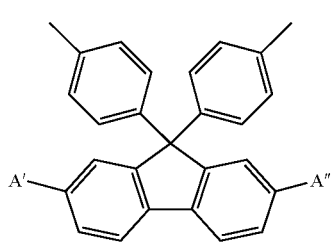

(6)

(In the formula, at least one of A' and A" represents —$CH_2N^+(CH_3)_3OH^-$, the other represents —$CH_2N(CH_3)_3$ $OH^-$ or a hydrogen atom)

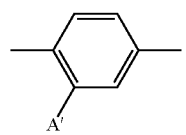

(6')

(In the formula, A' represents —$CH_2N^+(CH_3)_3OH^-$)

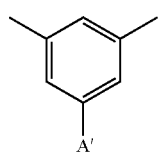

(6")

(In the formula, A' represents —$CH_2N^+(CH_3)_3OH^-$.)

The anion exchange resin has a hydrophobic unit formed by bonding the hydrophobic groups as described above to each other via an ether bond and a hydrophilic unit formed by bonding the hydrophilic groups as described above to each other via carbon-carbon bond.

It is noted that the unit corresponds to "block" commonly used in the block copolymer.

Preferred examples of the hydrophobic unit include a unit formed by bonding a bisphenol residue which may be substituted with a halogen atom as shown in the above formula (1) (a hydrophobic group) and a biphenylene group which may be substituted with a halogen atom as shown in the above formula (2) (a hydrophobic group) to each other via an ether bond. The bisphenol residue and the biphenylene group may be a unit formed by bonding two or more types of hydrophobic groups in random or block form.

For example, such hydrophobic unit is shown in the following formula (7).

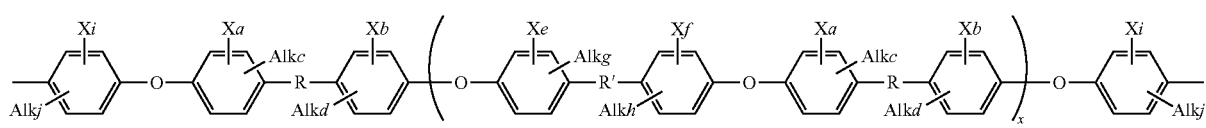

(7)

(In the formula, R and R' have the same meaning as R in the above formula (1); Alk has the same meaning as Alk in the above formula (1); X has the same meaning as X in the above formula (1); a, b, c, d, e, f, g, h, i, and j are the same or different and represents an integer of 0 to 4; and x represents a number of 0 to 200.)

In the above formula (7), x represents a number of, for example, 0 to 200, and preferably 4 to 50.

Particularly preferred examples of the hydrophobic unit include a unit formed by bonding a bisphenol residue as shown in the above formula (4) (a bisphenol A residue) and a biphenylene group as shown in the above formula (5) (biphenylene group in which each of benzene rings is substituted with four fluorine atoms) to each other via an ether bond; and by further bonding the unit and a phenylene group to each other via an ether bond.

For example, such hydrophobic unit is shown in the following formula (8).

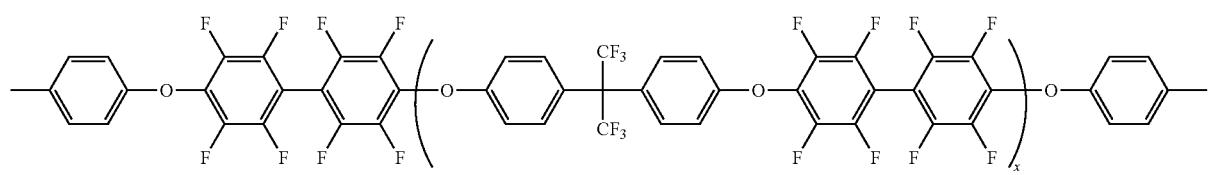

(8)

(In the formula, x represents a number of 0 to 200.)

Preferred examples of the hydrophilic unit include a unit formed by bonding a bisphenol fluorene residue substituted with a substituent group having an anion exchange group as shown in the above formula (3) (a hydrophilic group) and/or an o-, m- or p-phenylene group substituted with a substituent group having an anion exchange group as shown in the above formula (3') (a hydrophilic group) to each other via carbon-carbon bond. The unit may be a unit formed by bonding two or more types of hydrophilic groups to each other via carbon-carbon bond.

For example, such hydrophilic unit is shown in the following formula (9) or the following formula (9').

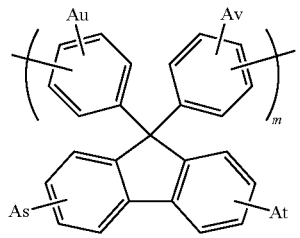

(9)

(In the formula, A has the same meaning as A in the above formula (3); s, t, u, and v have the same meaning as s, t, u, and v in the above formula (3'); and m represents a number of 1 to 200)

(9')

(In the formula, A has the same meaning as A in the above formula (3'); s has the same meaning as s in the above formula (3'); and m represents a number of 1 to 200.)

Particularly preferred examples of the hydrophilic unit include a unit formed by bonding bisphenol fluorene residues shown in the above formula (6) to each other via carbon-carbon bond; a unit formed by bonding p-phenylenes shown in the above formula (6') to each other via carbon-carbon bond; a unit formed by bonding m-phenylenes shown in the above formula (6') to each other via carbon-carbon bond; and a unit formed by bonding a p-phenylene shown in the above formula (6') and an m-phenylene shown in the above formula (6") to each other via carbon-carbon bond.

For example, such hydrophilic unit is shown in the following formula (10), the following formula (10'), the following formula (10"), or the following formula (10''').

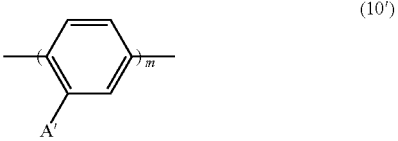

(10)

(In the formula, A' and A" have the same meaning as A' and A" in the above formula (6); and m has the same meaning as m in the above formula (9).)

(10')

(In the formula, A' has the same meaning as A' in the above formula (6'); and m has the same meaning as m in the above formula (9').)

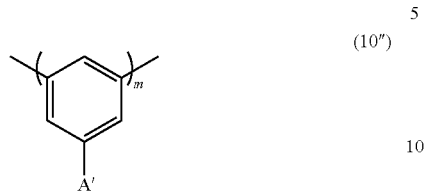
(10'')

(In the formula, A' has the same meaning as A' in the above formula (6''); and m has the same meaning as m in the above formula (9').)

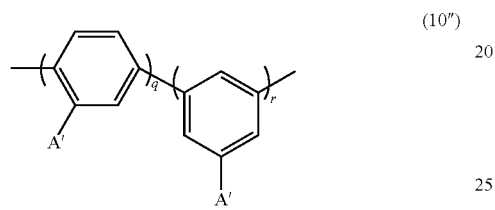
(10''')

(In the formula, A' has the same meaning as A' in the above formula (6') or the above formula (6''); and q and r have the same meaning as m in the above formula (9').)

In the anion exchange resin, the hydrophobic unit as described above and the hydrophilic unit as described above are bonded via carbon-carbon bond.

Preferred examples of the anion exchange resin include an anion exchange resin formed by bonding the hydrophobic unit as shown in the above formula (7) and the hydrophilic unit as shown in the above formula (9) via carbon-carbon bond, as shown in the following formula (11); or an anion exchange resin formed by bonding the hydrophobic unit as shown in the above formula (7) and the hydrophilic unit as shown in the above formula (9') via carbon-carbon bond, as shown in the following formula (11').

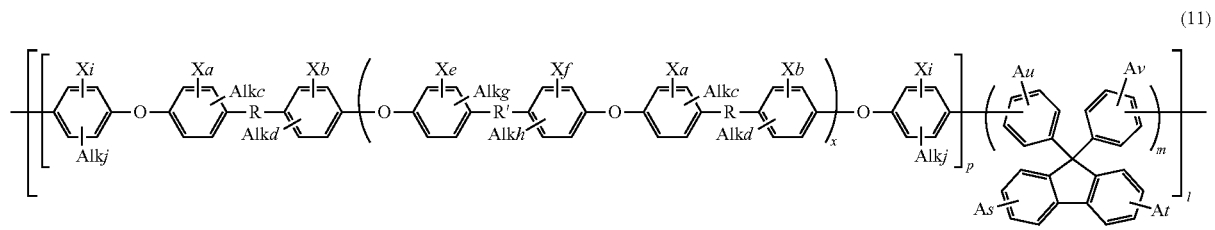
(11)

(In the formula, R and R' have the same meaning as R in the above formula (1); Alk has the same meaning as Alk in the above formula (1); X has the same meaning as X in the above formula (1); A has the same meaning as A in the above formula (3); a, b, c, d, e, f, g, h, i, j, s, t, u, and v are the same or different and represents an integer of 0 to 4; x has the same meaning as x in the above formula (7); p and m represents the blending ratio; and l represents a number of 1 to 100)

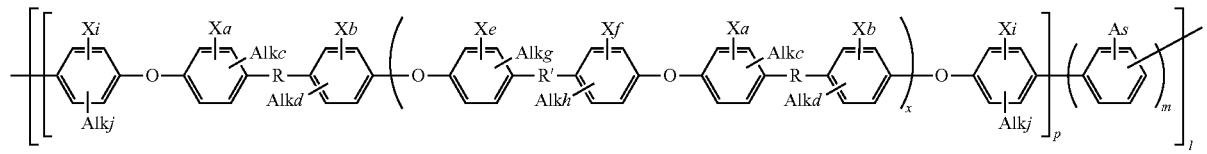

(11′)

(In the formula, R and R' have the same meaning as R in the above formula (1); Alk has the same meaning as Alk in the above formula (1); X has the same meaning as X in the above formula (1); A has the same meaning as A in the above formula (3); a, b, c, d, e, f, g, h, i, j, and s are the same or different and represents an integer of 0 to 4; x has the same meaning as x in the above formula (7); p and m represents the blending ratio; and l represents a number of 1 to 100.)

The number average molecular weight of the anion exchange resin is adjusted to be from 10 to 1000 kDa, and preferably from 30 to 500 kDa.

Particularly preferred examples of the anion exchange resin include an anion exchange resin formed by bonding a hydrophobic unit as shown in the above formula (8) and a hydrophilic unit as shown in the above formula (10) to each other via carbon-carbon bond, as shown in the following formula (12); an anion exchange resin formed by bonding a hydrophobic unit as shown in the above formula (8) and a hydrophilic unit as shown in the above formula (10′) to each other via carbon-carbon bond, as shown in the following formula (12′); an anion exchange resin formed by bonding a hydrophobic unit as shown in the above formula (8) and a hydrophilic unit as shown in the above formula (10″) to each other via carbon-carbon bond, as shown in the following formula (12″); and an anion exchange resin formed by bonding a hydrophobic unit as shown in the above formula (8) and a hydrophilic unit as shown in the above formula (10‴) to each other via carbon-carbon bond, as shown in the following formula (12‴).

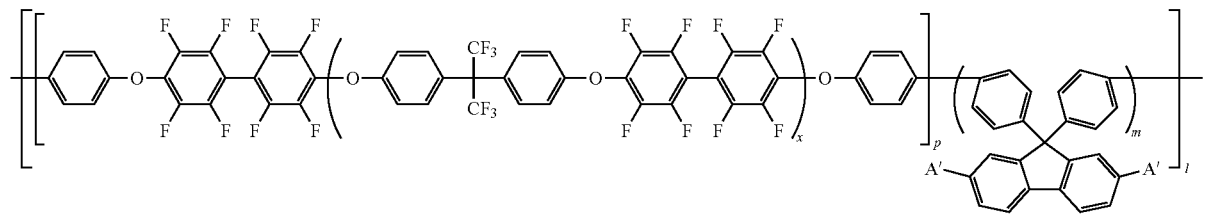

(12)

(In the formula, A' and A″ have the same meaning as A' and A″ in the above formula (6); x has the same meaning as x in the above formula (7); p and m represents the blending ratio; and l has the same meaning as l in the above formula (11).)

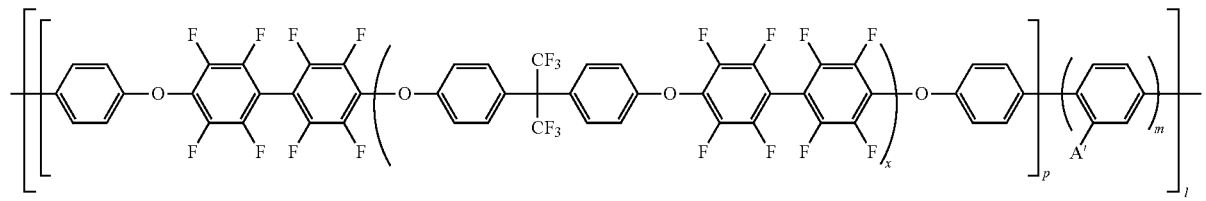

(12′)

(In the formula, A' has the same meaning as A' in the above formula (6'); x has the same meaning as x in the above formula (7); p and m represents the blending ratio; and l has the same meaning as l in the above formula (11').)

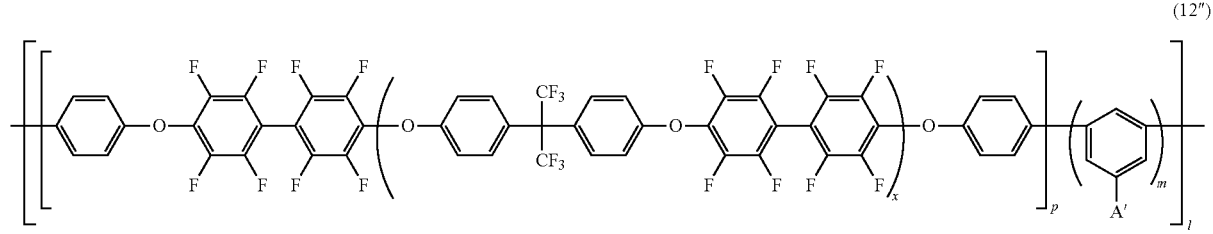

(In the formula, A' has the same meaning as A" in the above formula (6"); x has the same meaning as x in the above formula (7); p and m represents the blending ratio; and l has the same meaning as l in the above formula (11').)

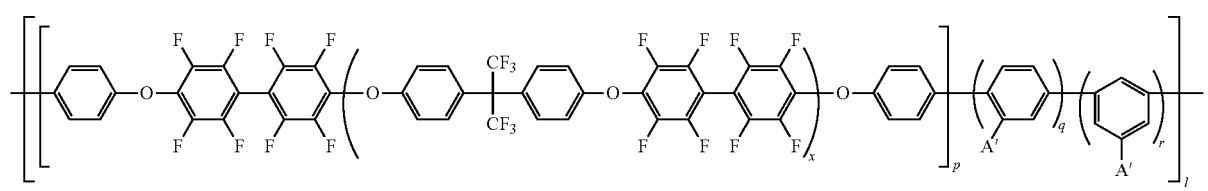

(In the formula, A' has the same meaning as A' in the above formula (6') or the above formula (6"); x has the same meaning as x in the above formula (7); p, q, and m represents the blending ratio; and l has the same meaning as l in the above formula (11').)

As described above, the number average molecular weight of the anion exchange resin is, for example, from 10 to 1000 kDa, and preferably from 30 to 500 kDa.

The method for producing the anion exchange resin is not particularly limited, and any method known in the art can be used. Preferably, the method by polycondensation reaction is used.

When the anion exchange resin is produced by the method, for example, a first oligomer for forming at least a part of the hydrophobic unit is produced by polycondensation reaction, and a second oligomer is optionally produced by polycondensation reaction of a monomer for forming the remaining hydrophobic unit, and a monomer for forming the hydrophilic unit is polymerized by cross-coupling reaction, and then a substituent group having an anion exchange group is introduced to the resulting precursor polymer for the anion exchange resin.

For polycondensation reaction, any conventional known method ("New Polymer Experiment 3, Synthesis Method and Reaction of Polymer (2), Synthesis of Condensation Polymer" p. 7-57, p. 399-401, (1996) KYORITSU SHUPPAN CO., LTD.), (J. Am. Chem. Soc., 129, 3879-3887 (2007)), (Eur. Polym. J., 44, 4054-4062 (2008)) can be used. Preferably, the method for reacting a dihalogenated compound and a diol compound is used.

In order to produce a first oligomer, a diol compound and a dihalogenated compound are polycondensed for forming a hydrophobic group.

Examples of the diol compound for forming a hydrophobic group include compounds having a plurality of (preferably two) aromatic rings as described above bonded to each other via the divalent hydrocarbon group as described above and two hydroxyl groups bonded to the aromatic rings.

Preferred examples of the diol compound for forming a hydrophobic group include compounds as shown in the following formula (13), which correspond to the above formula (1).

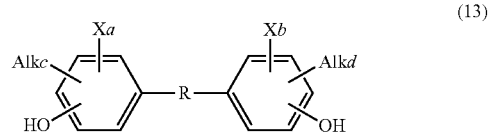

(In the formula, R has the same meaning as R in the above formula (1); Alk has the same meaning as Alk in the above formula (1); X has the same meaning as X in the above formula (1); and a, b, c, and d have the same meaning as a, b, c, and d in the above formula (1).)

Particularly preferred examples of the diol compound for forming a hydrophobic group include a compound as shown in the following formula (14) (2,2-bis(4-hydroxyphenyl)hexafluoropropane), which corresponds to the above formula (4).

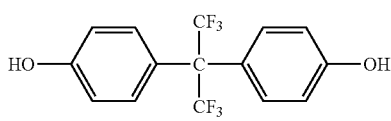

(14)

On the other hand, examples of the dihalogenated compound for forming a hydrophobic group include compounds having a plurality of (preferably two) aromatic rings as described above bonded to each other via the divalent hydrocarbon group as described above and two halogen atoms bonded to the aromatic rings.

Preferred examples of the dihalogenated compound for forming a hydrophobic group include compounds as shown in the following formula (13'), which correspond to the above formula (1).

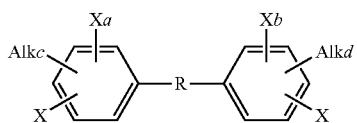

(13')

(In the formula, R has the same meaning as R in the above formula (1); Alk has the same meaning as Alk in the above formula (1); X has the same meaning as X in the above formula (1); and a, b, c, and d are the same or different and represents an integer of 0 to 4.)

Particularly preferred examples of the dihalogenated compound for forming a hydrophobic group include a compound as shown in the following formula (16) (decafluorobiphenyl), which corresponds to the above formula (5).

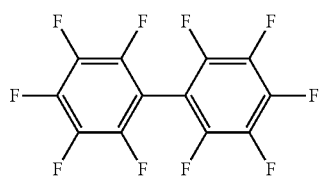

(16)

In the polycondensation reaction, the blending ratio of the diol compound and the dihalogenated compound for forming a hydrophobic group is adjusted so that the repeating number of the unit in the resulting first oligomer is x in the above formula (11) or formula (11').

The first oligomer is formed as a dihalogenated compound or a diol compound.

When the first oligomer is formed as a dihalogenated compound, the blending ratio of the diol compound and the dihalogenated compound is adjusted so that an excessive amount of the dihalogenated compound exists. Specifically, for 1 mol of the diol compound, the amount of the dihalogenated compound is preferably $(x+1)/x$ mol in a relationship of x in the above formula (7).

On the other hand, when the first oligomer is formed as a diol compound, the blending ratio of the diol compound and the dihalogenated compound is adjusted so that an excessive amount of the diol compound exists. Specifically, for 1 mol of the dihalogenated compound, the amount of the diol compound is preferably $(x+1)/x$ mol in a relationship of x in the above formula (7).

In the method, the diol compound and the dihalogenated compound are polycondensed for forming the hydrophobic group in an organic solvent.

Examples of the organic solvent include polar aprotic solvents.

Examples of the polar aprotic solvent include dimethyl sulfoxide, sulfolane, pyridine, N-methylpyrrolidone, N-cyclohexylpyrrolidone, N,N-dimethylformamide, and N,N-dimethylacetamide (DMAc).

The polar aprotic solvent may be used alone or in combination with two or more kinds.

Preferred examples of polar aprotic solvents include N,N-dimethylacetamide, and dimethyl sulfoxide.

As the organic solvent, a different solvent may be further used together.

The different solvent is not particularly limited. Examples of the different solvent include any known nonpolar solvents (for example, aliphatic hydrocarbons, halogenated aliphatic hydrocarbons (for example, chloroform), alicyclic hydrocarbons (for example, cyclohexane), and aromatic hydrocarbons); and any known aprotic aromatic solvents (for example, toluene, xylene, chlorobenzene or o-dichlorobenzene).

When the polar aprotic solvent is used in combination with a different solvent, the blending ratio is suitably selected depending on the purpose and application.

The blending ratio of the organic solvent for the diol compound and the dihalogenated compound for forming a hydrophobic group is suitably selected depending on the purpose and application.

In the polycondensation reaction, a basic compound can be blended.

Examples of the basic compound include carbonate salts such as, for example, lithium carbonate, sodium carbonate, sodium hydrogen carbonate, potassium carbonate, potassium hydrogen carbonate, cesium carbonate, magnesium carbonate, and calcium carbonate; metal hydroxides such as, for example, lithium hydroxide, sodium hydroxide, and potassium hydroxide; and phosphate salts such as, for example, sodium phosphate, sodium hydrogen phosphate, sodium dihydrogen phosphate, potassium phosphate, potassium hydrogen phosphate, and potassium dihydrogen phosphate.

The basic compound may be used alone or in combination with two or more kinds.

Preferred examples of the basic compound include metal carbonate salts. More preferred example of the basic compound includes potassium carbonate.

For example, when a carbonate salt catalyst is used, the blending amount of the basic compound is the same amount as hydroxyl groups presented in the reaction mixture, and preferably 1.2 or more mole with respect to 1 mole of hydroxyl groups presented in the reaction mixture.

The reaction temperature in the polycondensation reaction is, for example, from 50 to 300° C., and preferably from 50 to 200° C. The reaction time is, for example, from 1 to 20 hours, and preferably from 2 to 5 hours.

The first oligomer is preferably obtained as the dihalogenated compound by reacting the diol compound as shown in the above formula (13) and the dihalogenated compound as shown in the above formula (15), as described above.

Specifically, such dihalogenated compound is shown in the following formula (17).

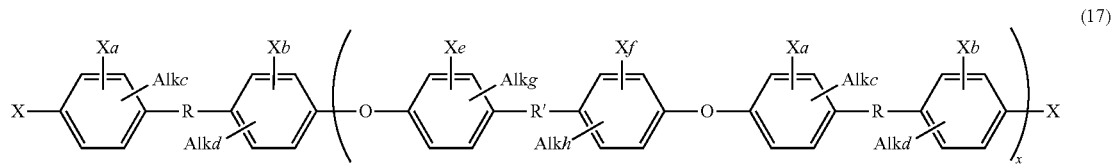

(17)

(In the formula, R and R' have the same meaning as R in the above formula (1); Alk has the same meaning as Alk in the above formula (1); X has the same meaning as X in the above formula (1); a, b, c, d, e, f, g, and h are the same or different and represents an integer of 0 to 4; and x has the same meaning as x in the above formula (7).)

Particularly preferably, the first oligomer is obtained as a dihalogenated compound or a diol compound, and preferably as a dihalogenated compound by reacting the diol compound as shown in the above formula (14) and the dihalogenated compound as shown in the above formula (16).

Specifically, such dihalogenated compound is shown in the following formula (18).

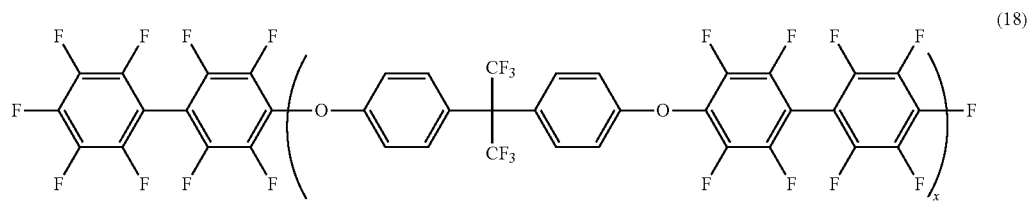

(18)

(In the formula, x has the same meaning as x in the above formula (7).)

For example, the first oligomer can be obtained as a diol compound by reacting the dihalogenated compound as shown in the above formula (13') and the diol compound as shown in the above formula (15'), as described above.

Specifically, such diol compound is shown in the following formula (17').

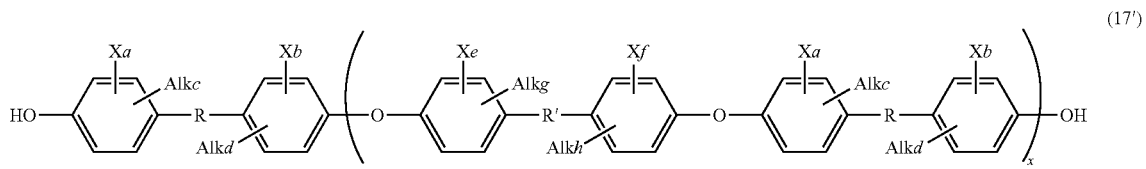

(17')

(In the formula, R and R' have the same meaning as R in the above formula (1); Alk has the same meaning as Alk in the above formula (1); X has the same meaning as X in the above formula (1); a, b, c, d, e, f, g, and h are the same or different and represents an integer of 0 to 4; and x has the same meaning as x in the above formula (7).)

For example, the second oligomer can be produced by polycondensation reaction of a first oligomer which is a dihalogenated compound and a halogenated phenol compound for forming a hydrophobic group.

Preferred examples of the halogenated phenol compound for forming a hydrophobic group include compounds as shown in the following formula (19) or (19').

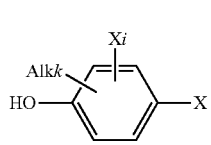

(19)

(In the formula, Alk has the same meaning as Alk in the above formula (1); X has the same meaning as X in the above formula (1); and i and k represent an integer of 0 to 4)

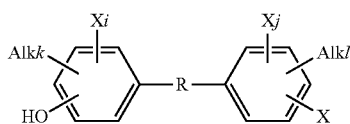

(19')

(In the formula, R has the same meaning as R in the above formula (1); Alk has the same meaning as Alk in the above formula (1); X has the same meaning as X in the above formula (1); and i, j, k, and l are the same or different and represents an integer of 0 to 4.)

Particularly preferred examples of the halogenated phenol compound for forming a hydrophobic group include a compound as shown in the following formula (19″).

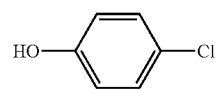

(19″)

The second oligomer is preferably obtained as a dihalogenated compound by reacting the dihalogenated compound as shown in the above formula (17) and the halogenated phenol compound as shown in the above formula (19).

Specifically, such dihalogenated compound is shown in the following formula (20).

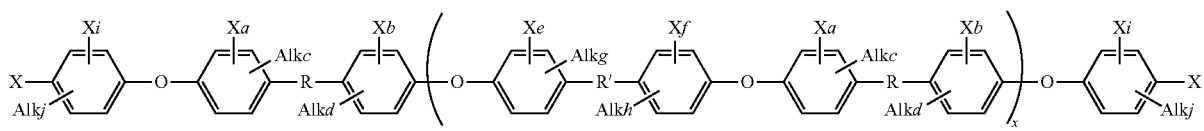

(20)

(In the formula, R and R' have the same meaning as R in the above formula (1); Alk has the same meaning as Alk in the above formula (1); X has the same meaning as X in the above formula (1); a, b, c, d, e, f, g, h, i, and j are the same or different and represents an integer of 0 to 4; and x has the same meaning as x in the above formula (7).)

Particularly preferably, the second oligomer is obtained as a dihalogenated compound by reacting the dihalogenated compound as shown in the above formula (18) and the halogenated phenol compound as shown in the above formula (19″).

Specifically, such dihalogenated compound is shown in the following formula (20').

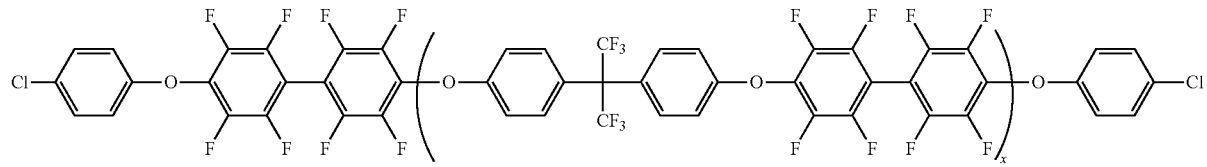
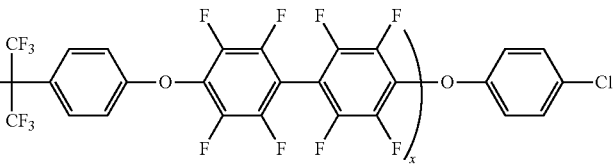

(20')

(In the formula, x has the same meaning as x in the above formula (7).)

For example, the second oligomer can be produced by polycondensation reaction of a first oligomer which is a diol compound and a dihalogenated benzene compound for forming a hydrophobic group.

Preferred examples of the dihalogenated benzene compound for forming a hydrophobic group include compounds as shown in the following formula (19a) or (19a').

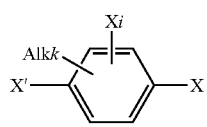

(19a)

(In the formula, Alk has the same meaning as Alk in the above formula (1); X and X' are the same or different and represent a halogen atom; and i and k are the same or different and represent an integer of 0 to 4)

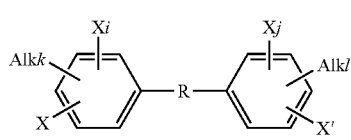

(19a')

(In the formula, R has the same meaning as R in the above formula (1); Alk has the same meaning as Alk in the above formula (1); each X is the same or different and represents a halogen atom; and i, j, k, and l are the same or different and represents an integer of 0 to 4.)

Particularly preferred examples of the dihalogenated benzene compound for forming a hydrophobic group include a compound as shown in the following formula (19a").

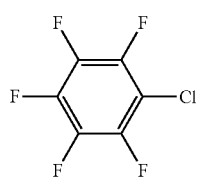

(19a")

And then, a monomer for forming a hydrophilic unit is polymerized by cross-coupling reaction to a first oligomer or a second oligomer. Examples of the monomer for forming a hydrophilic unit include the dihalogenated compounds for forming a hydrophilic unit.

Examples of the dihalogenated compound for forming a hydrophilic unit include compounds being composed of one aromatic ring, or being composed of a plurality of aromatic rings which are bonded to each other via a divalent hydrocarbon group or carbon-carbon bond.

Preferred examples of the dihalogenated compound for forming a hydrophilic unit include compounds as shown in the following formula (21), which correspond to the above formula (3) (bishalogenophenylfluorene); and compounds as shown in the following formula (21'), which correspond to the above formula (3') (dihalogenobenzene).

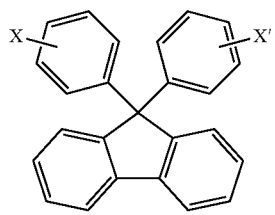

(21)

(In the formula, X and X' are the same or different and represent a halogen atom)

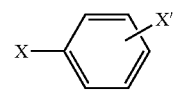

(21')

(In the formula, X and X' are the same or different and represent a halogen atom.)

In the cross-coupling reaction, the blending ratio of monomer for forming a hydrophilic unit is adjusted so that the repeating number of the hydrophilic group in the hydrophilic unit in the resulting precursor polymer for the anion exchange resin is m in the above formula (11) or formula (11').

In the method, any method known in the art can be used including a method by dissolving a first oligomer or a second oligomer and a monomer for forming a hydrophilic unit in a solvent such as N,N-dimethylacetamide or dimethyl sulfoxide, and then polymerizing them in the presence of a catalyst such as bis(1,5-cyclooctadiene)nickel (0).

The reaction temperature in the cross-coupling reaction is, for example, from −100 to 300° C., and preferably from −50 to 200° C. The reaction time is, for example, from 1 to 20 hours, and preferably from 2 to 5 hours.

By this reaction, a precursor polymer for an anion exchange resin, preferably a precursor polymer for an anion exchange resin as shown in the following formula (22) or a precursor polymer for an anion exchange resin as shown in the following formula (22'), is obtained.

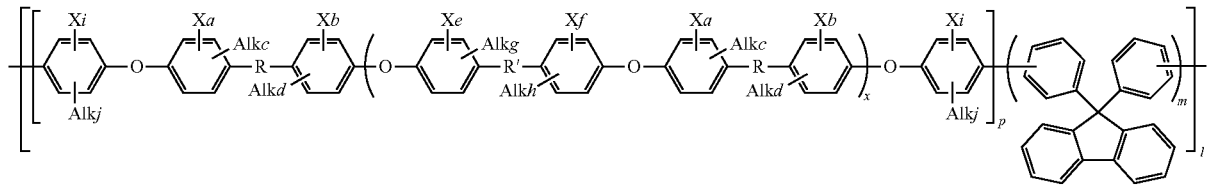

(22)

(In the formula, R and R' have the same meaning as R in the above formula (1); Alk has the same meaning as Alk in the above formula (1); X has the same meaning as X in the above formula (1); a, b, c, d, e, f, g, h, i, and j are the same or different and represents an integer of 0 to 4; x has the same meaning as x in the above formula (7); p and m represents the blending ratio; and l has the same meaning as l in the above formula (11).)

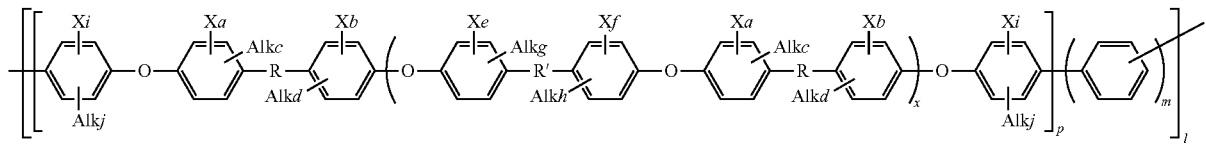

(22')

(In the formula, R and R' have the same meaning as R in the above formula (1); Alk has the same meaning as Alk in the above formula (1); X has the same meaning as X in the above formula (1); a, b, c, d, e, f, g, h, i, and j are the same or different and represents an integer of 0 to 4; x has the same meaning as x in the above formula (7); p and m represents the blending ratio; and l has the same meaning as l in the above formula (11').)

Particularly preferably, as the precursor polymer for the anion exchange resin, a precursor polymer for an anion exchange resin as shown in the following formula (23); a precursor polymer for an anion exchange resin as shown in the following formula (23'); a precursor polymer for an anion exchange resin as shown in the following formula (23"); or a precursor polymer for an anion exchange resin as shown in the following formula (23''') is obtained.

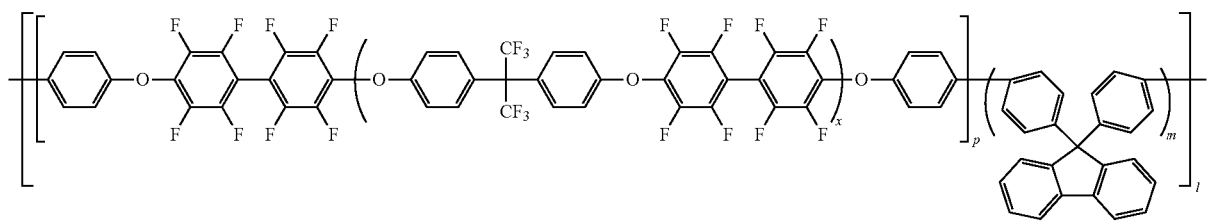

(23)

(In the formula, x has the same meaning as x in the above formula (7); p and m represents the blending ratio; and l has the same meaning as l in the above formula (11).)

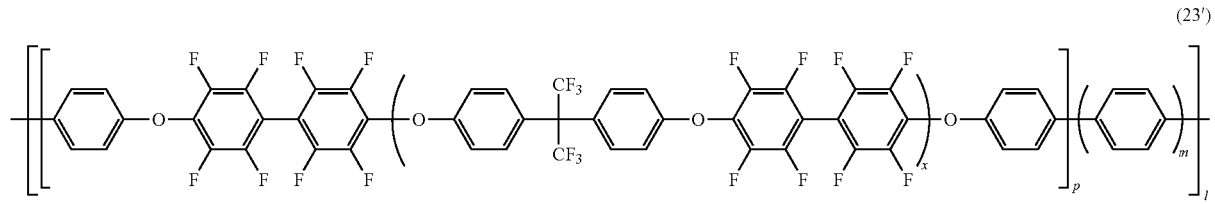

(23′)

(In the formula, x has the same meaning as x in the above formula (7); p and m represents the blending ratio; and l has the same meaning as l in the above formula (11′).)

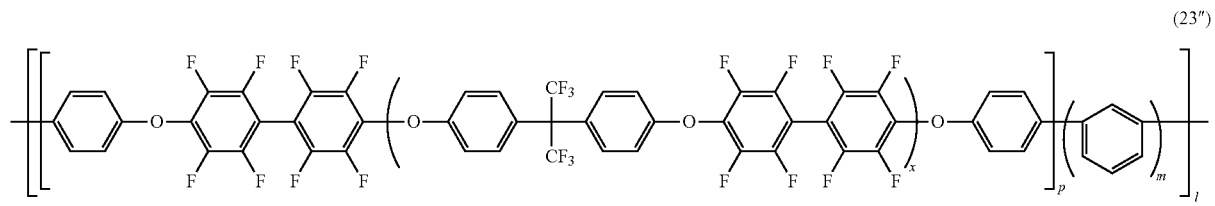

(23″)

(In the formula, x has the same meaning as x in the above formula (7); p and m represents the blending ratio; and l has the same meaning as l in the above formula (11′).)

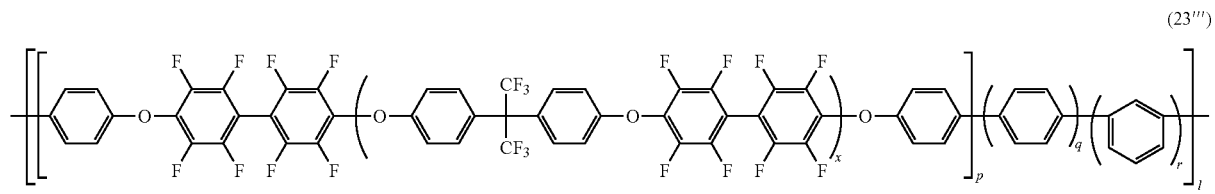

(23‴)

(In the formula, x has the same meaning as x in the above formula (7); p, q and r represents the blending ratio; and l has the same meaning as l in the above formula (11′).)

In the method, a substituent group having an anion exchange group is then introduced to a precursor polymer for an anion exchange resin.

The method for introducing the substituent group having an anion exchange group is not particularly limited, and any method known in the art can be used.

For example, a substituent group having an anion exchange group is introduced by chloroalkylating a precursor polymer for an anion exchange resin by chloroalkylation reaction, and then by quaternizing (for example, ammonizing) the chloroalkylated precursor polymer for an anion exchange resin.

The method for chloroalkylation reaction is not particularly limited, and any method known in the art can be used including a method by dissolving a precursor polymer for an anion exchange resin in a solvent such as tetrachloroethane, and then immersing the solution of the precursor polymer for an anion exchange resin in chloromethyl methyl ether in the presence of Lewis acid such as, for example, iron chloride or zinc chloride as a catalyst to produce the chloroalkylated product.

The reaction temperature in the chloroalkylation reaction is, for example, from 20 to 120° C., and preferably from 35 to 100° C. The reaction time is, for example, from 24 to 168 hours, and preferably from 36 to 120 hours.

By this reaction, a chloroalkylated precursor polymer for an anion exchange resin can be obtained.

In the quaternizing reaction, a substituent group having an anion exchange group is introduced by optionally forming a chloroalkylated precursor polymer for an anion exchange resin into a membrane by any method known in the art, and then adding a compound such as amines, phosphines, phosphazenes, sulfides, or boron compounds in a suitable ratio, and substituting the chlorine atom of the chloroalkyl group in the chloroalkylated precursor polymer with the compound.

Examples of the amine include secondary amines such as, for example, dimethylamine, diethylamine, diallylamine, di-n-propylamine, di-n-butylamine, and di-n-pentylamine; tertiary amines such as, for example, trimethylamine, N,N-dimethylethanolamine, triethylamine, triallylamine, tri-n-propylamine, tri-n-butylamine, tri-n-pentylamine, and tri-n-hexylamine; cyclic amines such as, for example, pyridine, quinoline and imidazole; and guanizine, for example.

The amine may be used alone or in combination with two or more kinds.

The reaction temperature in the quaternizing reaction is, for example, from 0 to 100° C., and preferably from 20 to 80° C. The reaction time is, for example, from 24 to 72 hours, and preferably from 48 to 72 hours.

In the method, the precursor polymer for an anion exchange resin can be quaternized, for example, in the form of solution without forming into a film.

In this method, compounds such as amines, phosphines, phosphazenes, sulfides, and boron compounds, which are described above, are optionally removed by any method known in the art.

By this reaction, a substituent group having an anion exchange group is introduced to a precursor polymer for an anion exchange resin to obtain an anion exchange resin, preferably an anion exchange resin as shown in the above formula (11) or an anion exchange resin as shown in the above formula (11'), particularly preferably an anion exchange resin as shown in the above formula (12), an anion exchange resin as shown in the above formula (12'), an anion exchange resin as shown in the above formula (12"), or an anion exchange resin as shown in the above formula (12''').

The ion exchange capacity of the anion exchange resin is, for example, from 0.1 to 4.0 meq./g, and preferably from 0.6 to 3.0 meq./g.

The ion exchange capacity can be calculated by the following equation (24).

[ion exchange capacity (meq./g)]=amount of the ion exchange group introduced×$m$×1000/(molecular weight of the first oligomer or the second oligomer×$p$+molecular weight of the hydrophilic unit×$m$ or $q$+molecular weight of the ion exchange group×$m$ or $q$) (24)

(In the equation, m has the same meaning as m in the above formula (9) or the above formula (9'); p has the same meaning as p in the above formula (7); and q has the same meaning as q in the above formula (10").)

The ion exchange capacity is defined as the number of the ion exchange group per the hydrophilic group.

The anion exchange resin has divalent hydrophobic groups being composed of one aromatic ring, or being composed of a plurality of aromatic rings which are bonded to each other via a divalent hydrocarbon group or carbon-carbon bond; and divalent hydrophilic groups being composed of one aromatic ring, or being composed of a plurality of aromatic rings which are bonded to each other via a divalent hydrocarbon group or carbon-carbon bond, where the aromatic ring or at least one of the aromatic rings have an anion exchange group; in which the divalent hydrophobic groups are bonded to each other via an ether bond to form a hydrophobic unit; in which the divalent hydrophilic groups are bonded to each other via carbon-carbon bond to form a hydrophilic unit; and in which the hydrophobic unit and the hydrophilic unit are bonded via carbon-carbon bond. Therefore, since the hydrophilic unit of the anion exchange resin does not have an ether bond, the anion exchange resin has an improved durability including alkali resistance.

More specifically, if the hydrophilic unit has an ether bond, hydroxide ion (OH⁻) may decompose the anion exchange resin as described below, and the anion exchange resin may have insufficient alkali resistance.

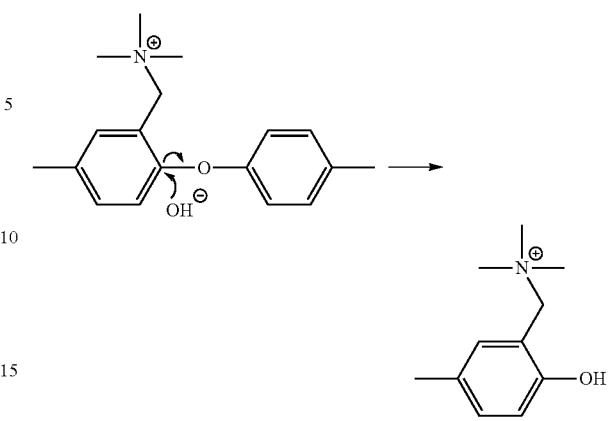

In contrast, since the hydrophilic unit of the anion exchange resin of the present invention does not have an ether bond, the decomposition by the mechanism as described above does not occur, and therefore the anion exchange resin has an improved durability including alkali resistance.

Additionally, the present invention includes an electrolyte layer for a fuel cell (an electrolyte membrane for a fuel cell) and a binder for forming an electrode catalyst layer produced from the anion exchange resin, and a fuel cell having the electrolyte layer for the fuel cell as the electrolyte layer.

FIG. 1 is a schematic diagram showing an embodiment of the fuel cell of the present invention. In FIG. 1, this fuel cell 1 has a cell S for the fuel cell. The cell S for the fuel cell has a fuel side electrode 2, an oxygen side electrode 3, and an electrolyte membrane 4. The fuel side electrode 2 and the oxygen side electrode 3 are oppositely disposed by interposing the electrolyte membrane 4 between them.

As the electrolyte membrane 4, the anion exchange resin as described above can be used. (That is, the electrolyte membrane 4 includes the anion exchange resin as described above.)

The electrolyte membrane 4 may be reinforced with a reinforcing material known in the art, for example, a porous substrate. Further, the electrolyte membrane 4 may be processed by various procedures including biaxially orientation procedure for controlling the molecular orientation, heat procedure for controlling the crystallinity and the residual stress. A filler known in the art can be added to the electrolyte membrane 4 in order to improve the mechanical strength of the electrolyte membrane 4. The electrolyte membrane 4 and a reinforcing material such as glass unwoven fabric may be pressed to form the complex.

A commonly-used various additive, for example, a compatibilizing agent for improving the compatibility, an antioxidant for preventing the degradation of the resin, and an antistatic agent or a lubricant for improving the handling in forming into the film can be suitably included in the electrolyte membrane 4, as long as the additive does not have an effect on the processability and properties of the electrolyte membrane 4.

The thickness of the electrolyte membrane 4 is not particularly limited, and is suitably selected depending on the purpose and application.

The thickness of the electrolyte membrane 4 is, for example, from 1.2 to 350 μm, and preferably from 5 to 200 μm.

The fuel side electrode 2 is contacted with one surface of the electrolyte membrane 4 so as to be disposed oppositely.

For example, the fuel side electrode 2 has the catalyst layer (the battery electrode catalyst layer) in which a catalyst is supported on a porous carrier.

The porous carrier is not particularly limited, and example of the porous carrier includes a water-repellent carrier such as carbon.

The catalyst of the electrode is not particularly limited, and examples of the catalyst include group 8-10 elements in periodic table (according to IUPAC Periodic Table of the Elements (version date 19 Feb. 2010); the same shall apply hereinafter) such as, for example, platinum group elements (Ru, Rh, Pd, Os, Ir, and Pt), and iron group elements (Fe, Co, and Ni); or group 11 elements in periodic table such as, for example, Cu, Ag, and Au, and combination thereof. Preferred examples of the catalyst include Pt (platinum).

For the fuel side electrode 2, for example, the porous carrier and the catalyst are dispersed in an electrolyte solution known in the art to prepare an ink for an electrode. Optionally, the viscosity of the ink for the electrode is adjusted by blending with a suitable amount of an organic solvent such as alcohols, and the ink for the electrode is applied to one surface of the electrolyte membrane 4 by any method known in the art (for example, spraying method or die coater method), and dried at a determined temperature to produce the fuel side electrode 2 as the thin electrode membrane attached to the surface of the electrolyte membrane 4.

The amount of the catalyst for the electrode supported on the fuel side electrode 2 is not particularly limited, and the amount is, for example, from 0.1 to 10.0 mg/cm$^2$, and preferably from 0.5 to 5.0 mg/cm$^2$.

In the fuel side electrode 2, a fuel to be supplied is reacted with a hydroxide ion (OH$^-$) passed through the electrolyte membrane 4 to form an electron (e$^-$) and water (H$_2$O), as described below. For example, when the fuel is hydrogen (H$_2$), only an electron (e$^-$) and water (H$_2$O) are formed. When the fuel is hydrazine (NH$_2$NH$_2$), an electron (e$^-$), water (H$_2$O), and nitrogen (N$_2$) are formed.

The oxygen side electrode 3 is contacted with the other surface of the electrolyte membrane 4 so as to be disposed oppositely. For example, the oxygen side electrode 3 has the catalyst layer (the battery electrode catalyst layer) in which a catalyst is supported on a porous carrier.

For the oxygen side electrode 3, for example, the porous carrier and the catalyst are dispersed in an electrolyte solution known in the art to prepare an ink for the electrode. Optionally, the viscosity of the ink for the electrode is adjusted by blending with a suitable amount of an organic solvent such as alcohols, and the ink for the electrode is applied to the other surface of the electrolyte membrane 4 by any method known in the art (for example, spraying method or die coater method), and dried at a determined temperature to produce the oxygen side electrode 3 as the thin electrode membrane attached to the other surface of the electrolyte membrane 4.

Therefore, the electrolyte membrane 4, the fuel side electrode 2, and the oxygen side electrode 3 form a membrane-electrode assembly by attaching the fuel side electrode 2 in the form of thin membrane to the one surface of the electrolyte membrane 4, and attaching the oxygen side electrode 3 in the form of thin membrane to the other surface of the electrolyte membrane 4.

The amount of the catalyst for the electrode supported on the oxygen side electrode 3 is not particularly limited, and the amount is, for example, from 0.1 to 10.0 mg/cm$^2$, and preferably from 0.5 to 5.0 mg/cm$^2$.

In the oxygen side electrode 3, oxygen (O$_2$) to be supplied, water (H$_2$O) passed through the electrolyte membrane 4, and an electron (e$^-$) passed through an external circuit 13 are reacted to form a hydroxide ion (OH$^-$), as described below.

The cell S for the fuel cell further has a fuel supplying member 5 and an oxygen supplying member 6. The fuel supplying member 5 is composed of a gas impermeable conductive member, and one surface of the fuel supplying member 5 is contacted with the fuel side electrode 2 so as to be disposed oppositely. A fuel side path 7 for contacting the fuel with the whole of the fuel side electrode 2 is formed as a winding groove on one surface of the fuel supplying member 5. A supply inlet 8 and an outlet 9 are perforating through the fuel supplying member 5, and the supply inlet 8 and the outlet 9 are continuously formed on the upstream side edge and the downstream side edge of the fuel side path 7, respectively.

The oxygen supplying member 6 is also composed of a gas impermeable conductive member like the fuel supplying member 5, and one surface of the oxygen supplying member 6 is contacted with the oxygen side electrode 3 so as to be disposed oppositely. An oxygen side path 10 for contacting oxygen (air) with the whole of the oxygen side electrode 3 is formed as a winding groove on one surface of the oxygen supplying member 6, too. A supply inlet 11 and an outlet 12 are perforating through the oxygen supplying member 6, and the supply inlet 11 and the outlet 12 are continuously formed on the upstream side edge and the downstream side edge of the oxygen side path 10, respectively.

This fuel cell 1 is actually formed as a stack structure in which a plurality of cells S for the fuel cell is layered. Therefore, the fuel supplying member 5 and the oxygen supplying member 6 are actually formed as a separator, and the fuel side path 7 and the oxygen side path 10 are formed on both surfaces of the members.

The fuel cell 1 has a current collector being formed by a conductive member, not shown in the drawings. The electromotive force generated from the fuel cell 1 can be transmitted outwardly through terminals on the current collector.

In FIG. 1, the fuel supplying member 5 and the oxygen supplying member 6 of the cell S for the fuel cell are bonded via the external circuit 13, and a voltmeter 14 is disposed in the external circuit 13 to measure the generated voltage.

In the fuel cell 1, the fuel is supplied to the fuel side electrode 2 directly without the reforming process, or after the reforming process.

Examples of the fuel include a hydrogen-containing fuel.

The hydrogen-containing fuel is a fuel having hydrogen atom in the molecule. Examples of the hydrogen-containing fuel include hydrogen gas, alcohols, and hydrazines. Preferred examples of the hydrogen-containing fuel include hydrogen gas and hydrazines.

Specific examples of hydrazines include hydrazine (NH$_2$NH$_2$), hydrated hydrazine (NH$_2$NH$_2$.H$_2$O), hydrazine carbonate ((NH$_2$NH$_2$)$_2$CO$_2$), hydrazine hydrochloride (NH$_2$NH$_2$.HCl), hydrazine sulfate (NH$_2$NH$_2$.H$_2$SO$_4$), monomethylhydrazine (CH$_3$NHNH$_2$), dimethylhydrazine ((CH$_3$)$_2$NNH$_2$, CH$_3$NHNHCH$_3$), and carbonhydrazide ((NHNH$_2$)$_2$CO). The listed fuel may be used alone or in combination with two or more kinds.

Among these fuel compounds, carbon-free compounds, i.e., hydrazine, hydrated hydrazine, and hydrazine sulfate do not generate CO and CO$_2$, and do not occur the catalyst poisoning. Therefore, the compounds have an improved durability, and zero-emission can be substantially accomplished.

Although the listed fuel may be used as it is, the listed fuel compound can be used as a solution in water and/or an alcohol (for example, a lower alcohol such as methanol, ethanol, propanol, or isopropanol). In this case, the concentration of the fuel compound in the solution varies depending on the type of the fuel compound, for example, from 1 to 90 mass %, and preferably from 1 to 30 mass %. The listed solvent may be used alone or in combination with two or more kinds.

The listed fuel compound can be used in the form of gas (for example, steam).

By supplying the fuel to the fuel side path 7 of the fuel supplying member 5 while supplying oxygen (air) to the oxygen side path 10 of the oxygen supplying member 6, on the oxygen side electrode 3, an electron ($e^-$) generated in the fuel side electrode 2 and passed through the external circuit 13, water ($H_2O$) generated in the fuel side electrode 2, and oxygen ($O_2$) are reacted to form a hydroxide ion ($OH^-$), as described below. The formed hydroxide ion ($OH^-$) is moved from the oxygen side electrode 3 to the fuel side electrode 2 in the electrolyte membrane 4 being composed of an anion exchange membrane. On the fuel side electrode 2, a hydroxide ion ($OH^-$) passed through the electrolyte membrane 4 and the fuel are reacted to form an electron ($e^-$) and water ($H_2O$). The formed electron (e) is moved from the fuel supplying member 5 to the oxygen supplying member 6 via the external circuit 13, and supplied to the oxygen side electrode 3. The formed water ($H_2O$) is moved from the fuel side electrode 2 to the oxygen side electrode 3 in the electrolyte membrane 4. The electromotive force was generated by electrochemical reaction on the fuel side electrode 2 and the oxygen side electrode 3 to produce electricity.

Although the operating condition of the fuel cell 1 is not particularly limited, for example, the condition in which the applied pressure on the fuel side electrode 2 is 200 kPa or less, and preferably 100 kPa or less, the applied pressure on the oxygen side electrode 3 is 200 kPa or less, and preferably 100 kPa or less, and the temperature of the cell S for the fuel cell is from 0 to 120° C., and preferably from 20 to 80° C. is selected.

In the fuel cell 1, the electrolyte membrane for a fuel cell having the anion exchange resin having an improved durability as described above is used in the electrolyte membrane 4.

Therefore, the electrolyte membrane for a fuel cell of the present invention obtained by using the anion exchange resin of the present invention, and the fuel cell having the electrolyte membrane for a fuel cell have an improved durability.

The present invention also includes a binder for forming an electrode catalyst layer having an anion exchange resin, an electrode catalyst layer for a fuel cell having the binder for forming an electrode catalyst layer, and the fuel cell having the electrolyte layer for a fuel cell.

Thus, in the fuel cell 1, the anion exchange resin can be included in the binder for forming the electrode catalyst layer during the formation of the fuel side electrode 2 and/or the oxygen side electrode 3.

Specifically, as the method for including the anion exchange resin in the binder for forming an electrode catalyst layer, for example, the binder for forming an electrode catalyst layer is prepared by cutting the anion exchange resin into pieces, and then dissolving the resin in a suitable amount of an organic solvent such as alcohols.

In the binder for forming the electrode catalyst layer, the amount of the anion exchange resin is, for example, from 2 to 10 parts by weight, and preferably from 2 to 5 parts by weight with respect to 100 parts by weight of the binder for forming the electrode catalyst layer.

By using the binder for forming an electrode catalyst layer for the formation of the catalyst layer (the battery electrode catalyst layer) of the fuel side electrode 2 and/or the oxygen side electrode 3, the catalyst layer (the battery electrode catalyst layer) can have the anion exchange resin. Therefore, the fuel cell 1 having the catalyst layer (the battery electrode catalyst layer) including the anion exchange resin can be obtained.

In the fuel cell 1, the binder for forming the electrode catalyst layer including the anion exchange resin having an improve durability as described above is used for the formation of the battery electrode catalyst layer.

Therefore, the binder for forming the electrode catalyst layer of the present invention obtained by using the anion exchange resin of the present invention, and the battery electrode catalyst layer obtained by using the binder for forming the electrode catalyst layer have an improved durability and an improved anion conductivity.

As a result, the fuel cell having the battery electrode catalyst layer has an improved durability and an improved anion conductivity.

Although exemplary embodiments of the present invention have been described hereinabove, the embodiments of the present invention are not limited to these embodiments, but may be suitably modified by those skilled in the art without departing from the scope of the invention.

Exemplary applications of the fuel cell of the present invention includes power supplies of drive motors for automobiles, marine vessels, or aircrafts; and power supplies for communication terminals including mobile phones.

EXAMPLE

Although the present invention is described based on the Example and the Comparative Example, the present invention is not limited to the following Example.

Example

<Synthesis of First Oligomer>

To a 100 mL of three necked round-shaped flask equipped with a nitrogen inlet and a Dean Stark trap, hexafluorobisphenol A (2,2-bis(4-hydroxyphenyl)hexafluoropropane) (3.36 g, 10.0 mmol), potassium carbonate (2.07 g, 15.0 mmol), N,N-dimethylacetamide (23 ml), and toluene (5 ml) were added. After stirring the mixture to dissolve hexafluorobisphenol A, the mixture was heated to 150° C. and dehydrated for 3 hours while azeotroping with toluene.

After dehydration, toluene in the Dean Stark trap was removed, and then toluene was removed in the mixture by trapping the refluxed toluene. After that, the mixture was cooled to the ambient temperature, and decafluorobiphenyl (4.18 g, 12.5 mmol) was added to the mixture. The mixture was heated to 60° C. and reacted for 2 hours.

At this time, decafluorobiphenyl (0.42 g, 1.3 mmol) was added as an end-capping agent, and then reacted for further 1 hour.

The reaction was quenched by adding the reaction mixture dropwise in hot water to precipitate the product. The product was filtered and collected, washed with hot water and hot methanol several times, and dried overnight at 60° C. under vacuum.

The first oligomer having a white color as shown in the following formula (x=6) was obtained in a yield of 87%.

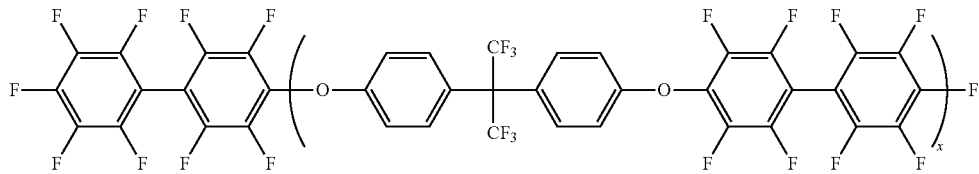

<Synthesis of Second Oligomer>

To a 100 mL of three necked round-shaped flask equipped with a nitrogen inlet, the first oligomer (3.00 g, 0.893 mmol), 4-chlorophenol (0.29 g, 2.2 mmol), potassium carbonate (0.43 g, 3.0 mmol), and N,N-dimethylacetamide (30 ml) were added. After stirring the mixture to dissolve the first oligomer and 4-chlorophenol, the mixture was heated to 40° C. and reacted for 3 hours.

The reaction was quenched by adding the reaction mixture dropwise in pure water to precipitate the product. The product was filtered and collected, washed with pure water and methanol several times, and dried overnight at 60° C. under vacuum.

The second oligomer having a white color as shown in the following formula (x=6) was obtained in a yield of 87%.

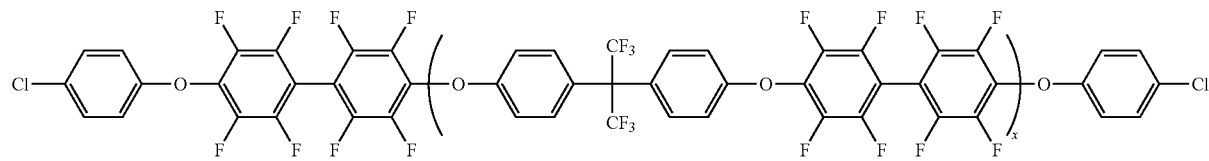

<Synthesis of Precursor Polymer for Anion Exchange Resin>

To a 100 mL of three necked round-shaped flask equipped with a nitrogen inlet, a mechanical stirrer and a condenser, the second oligomer (0.60 g, 0.14 mmol), 1,4-dichlorobenzene (0.04 g, 0.3 mmol), 1,3-dichlorobenzene (0.16 g, 1.1 mmol), 2,2'-bipyridine (0.57 g, 3.6 mmol), bis(1,5-cyclooctadiene)nickel (0) (1.00 g, 3.60 mmol), and N,N-dimethylacetamide (10 ml) were added. After stirring the mixture to dissolve the second oligomer, 1,4-dichlorobenzene and 1,3-dichlorobenzene, the mixture was heated to 80° C. and reacted for 3 hours.

The reaction was quenched by adding the reaction mixture dropwise in hydrochloric acid to precipitate the product. The product was filtered and collected, washed with pure water and methanol several times, and dried overnight at 60° C. under vacuum.

The precursor polymer of the anion exchange resin having a white color as shown in the following formula (x=6, p=1, q=2, r=8, l=1.5) was obtained in a yield of 92%.

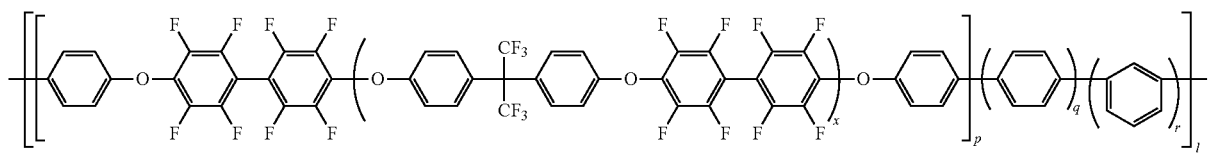

<Introduction of Anion Exchange Group>
(Chloromethylation Reaction)

To a 100 mL of glass reactor, the precursor polymer for anion exchange resin (0.60 g) and 1,1,2,2-tetrachloroethane (27 ml) were added. After stirring the mixture to dissolve the precursor polymer for anion exchange resin, in a glove box under argon, chloromethyl methyl ether (16 ml), and zinc chloride (0.5 mol/L solution in tetrahydrofuran) (3 ml) were added and reacted at 80° C. for 5 days.

The reaction was quenched by adding the reaction mixture dropwise in methanol to precipitate the product. The product was filtered and collected, washed with methanol several times, and dried overnight at 60° C. under vacuum.

By this method, the precursor polymer for anion exchange resin was chloromethylated.

(Forming into Membrane)

The chloromethylated precursor polymer for anion exchange resin was formed into the membrane by solution casting method.

That is, the chloromethylated precursor polymer for anion exchange resin (0.5 g) was dissolved in 1,1,2,2-tetrachloroethane (5 ml), and filtered through a glass filter (G3). The filtrate was passed through a glass plate wound with silicone rubber, and kept it on a hot plate adjusted so as to be oriented horizontally at 50° C., and dried to obtain a transparent membrane having a thickness of about 50 μm.

(Quaternizing Reaction)

The membrane of the chloromethylated precursor polymer for anion exchange resin was immersed in 45 mass % solution of trimethylamine in water for 2 days, and quaternized the polymer to obtain a transparent membrane of the anion exchange resin.

Since the counter ion of the ion exchange group (ammonio group) in the membrane is chloride, the membrane was converted to the hydroxide salts by immersing in 1 mol/L of aqueous potassium hydroxide for 2 days and washing with degassed pure water.

<Durability Test>

The durability test was performed for the membrane of the anion exchange resin obtained in Example. Specifically, IRs of the membrane of the anion exchange resin were measured before the test and after immersing the membrane in 1 M aqueous KOH solution (80° C.) for 24 hours.

Figure 2:
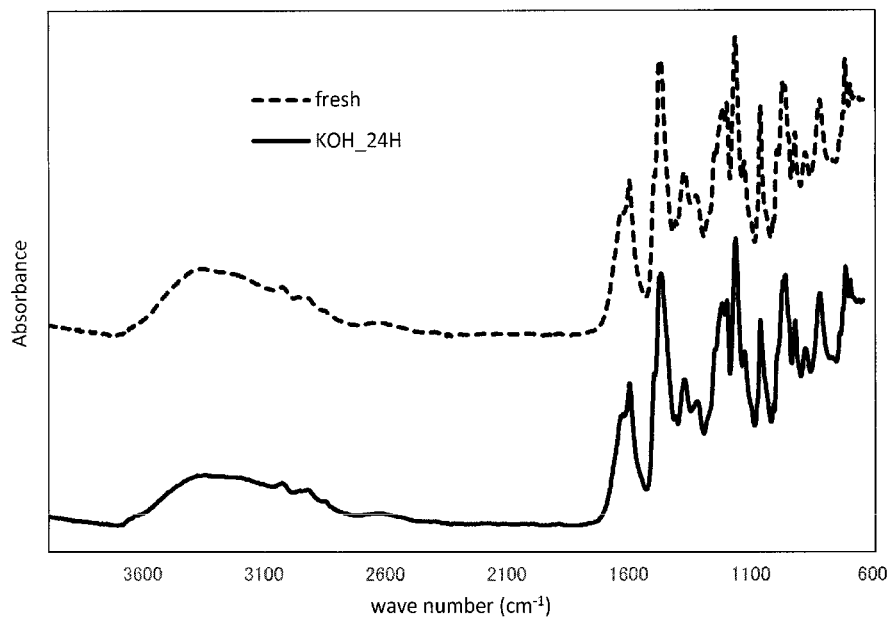
FIG. 2 shows IR measurement results before and after the durability test of Example.

As the result is shown in FIG. 2, no peak suggesting the cleavage of ether bond (peak based on O—H) was investigated even after the durability test.

Figure 3:
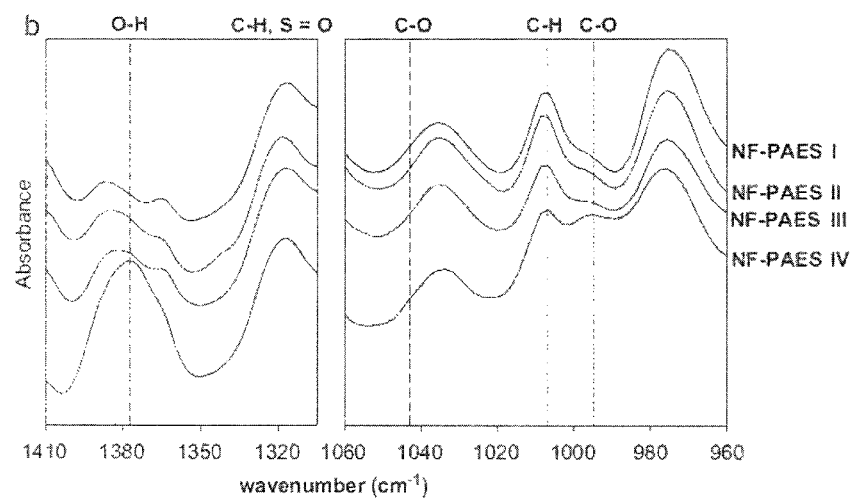
FIG. 3 shows IR measurement results before and after the durability test of Comparative Example.

In contrast, Journal of Membrane Science Volumes 423-424 (2012) Pages 438-449 describes that a peak based on O—H, suggesting the cleavage of ether bond, was investigated for the membrane of the anion exchange resin being composed of NF-PAES having the following structure after the durability test, as shown in FIG. 3 extracted from FIG. 2 of the same literature (Compared NF-PAES I (before the durability test) to NF-PAES IV (after immersing 0.5 M of aqueous NaOH solution (80° C.) for 1 hour)).

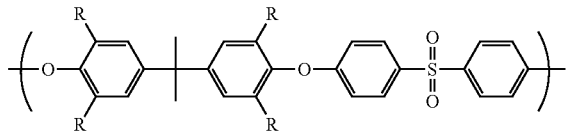

NF-PAES parent polymer, R = CH$_3$

Br$_2$, PhCl, 135° C.

Brominated NF-PAES, R = CH$_3$ or CH$_2$Br 1) cast film
2) N(CH$_3$)$_3$, 25° C.

NF-PAES AEM, R = CH$_3$ or CH$_2$N$^+$(CH$_3$)$_3$Br$^-$

Although the durability test of Example was stricter than the durability test described in the following document, in Example, no peak suggesting the cleavage of ether bond (peak based on O—H) was investigated even after the durability test. Therefore, it has been found that the membrane has an improved alkali resistance.

DENOTATION OF REFERENCE NUMERALS 1 fuel cell
2 fuel side electrode
3 oxygen side electrode
4 electrolyte membrane
S cell for the fuel cell

What is claimed is:
1. An anion exchange resin comprising:
divalent hydrophobic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; and
divalent hydrophilic groups being composed of one aromatic ring, or being composed of a plurality of aromatic rings which are bonded to each other via a divalent hydrocarbon group or carbon-carbon bond, the aromatic ring or at least one of the aromatic rings having an anion exchange group;
wherein the divalent hydrophobic groups are bonded to each other via an ether bond to form a hydrophobic unit;
wherein the divalent hydrophilic groups are bonded to each other via carbon-carbon bond to form a hydrophilic unit; and
wherein the hydrophobic unit and the hydrophilic unit are bonded via carbon-carbon bond, wherein each of the hydrophobic groups has a bisphenol residue or a bisphenol residue substituted with a halogen atom or an alkyl group of formula (1):

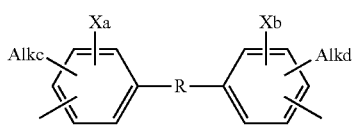

(1)

wherein R is a hydrocarbon group, a hydrocarbon group substituted with a halogen atom, a silicon-containing group, a silicon-containing group substituted with a halogen atom, a nitrogen-containing group, a nitrogen-containing group substituted with a halogen atom, a phosphorus-containing group, a phosphorus-containing group substituted with a halogen atom, an oxygen-containing group, an oxygen-containing group substituted with a halogen atom, a sulfur-containing group, a sulfur-containing group substituted with a halogen atom, or direct bond; wherein each Alk is the same or a different alkyl group; wherein each X is the same or a different halogen atom or cyano group; and wherein a, b, c, and d are the same or a different integer from 0 to 4, and wherein each of the hydrophilic groups is: a bisphenol fluorene residue substituted with a substituent group having the anion exchange group of formula (3):

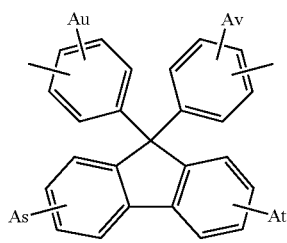

(3)

wherein each A is —$CH_2N^+(CH_3)_3OH^-$ as an anion exchange group; wherein s, t, u, and v are the same or a different integer from 0 to 4; and at least one of s, t, u, and v is an integer from 1 to 4 and/or an o-, m- or p-phenylene group substituted with a substituent group having the anion exchange group, of formula (3'):

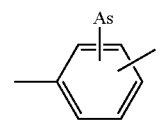

(3')

wherein A is —$CH_2N^+(CH_3)_3OH^-$ as an anion exchange group; and s is an integer from 1 to 4.

2. An electrolyte membrane for a fuel cell comprising the anion exchange resin according to claim 1.

3. A binder for forming an electrode catalyst layer comprising the anion exchange resin according to claim 1.

* * * * *